April 3, 1956 R. J. BELER 2,740,271
FLEXIBLE COUPLINGS
Filed Dec. 21, 1951
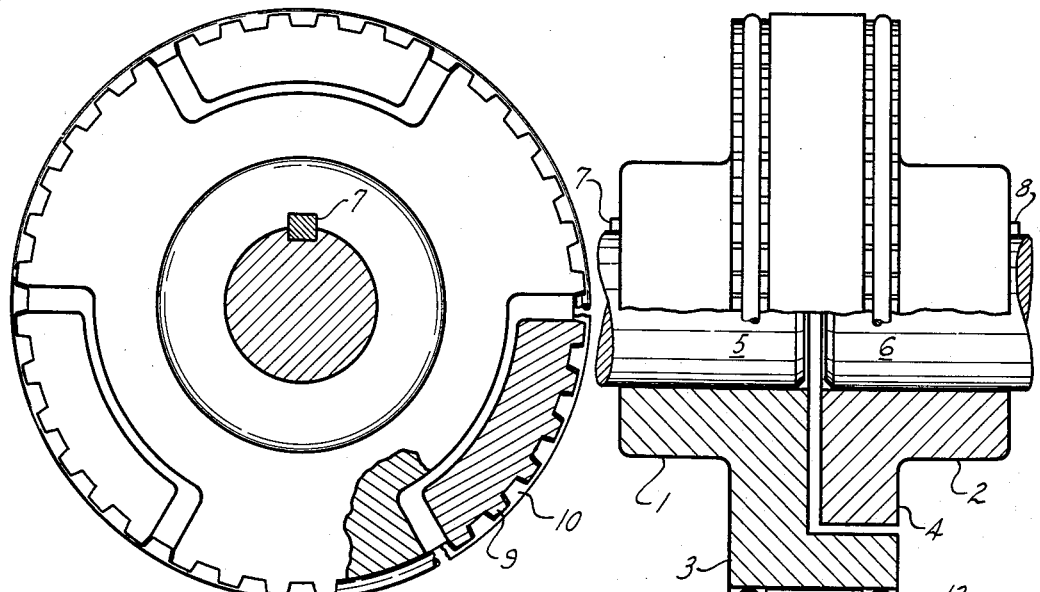
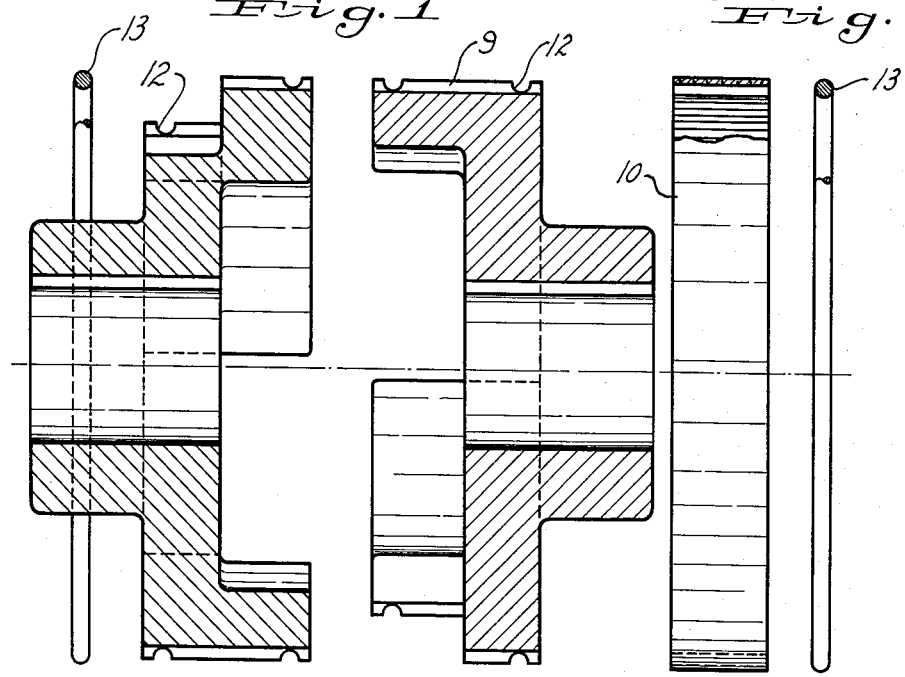
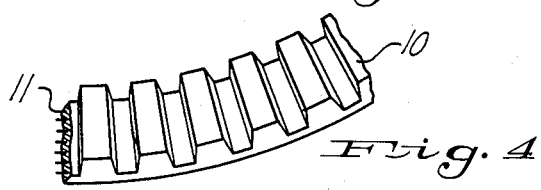
INVENTOR.
Robert J. Beler
BY William B. Jaspert
Attorney.

United States Patent Office 2,740,271
Patented Apr. 3, 1956

2,740,271

FLEXIBLE COUPLINGS

Robert J. Beler, Pittsburgh, Pa.

Application December 21, 1951, Serial No. 262,696

1 Claim. (Cl. 64—11)

This invention relates to new and useful improvements in flexible couplings for coupling coaxially aligned shafts, and it is among the objects thereof to provide a flexible coupling which is of simple construction, flexible in its operation and adapted to allow for misalignment of the coupled shafts without appreciable vibration or unbalance.

The invention will become more apparent from a description of the accompanying drawing, constituting a part hereof, in which like reference characters designate like parts, and in which—

Fig. 1 is a side elevational view of a coupling embodying the principles of this invention, partially in cross section to illustrate the relationship of the coupling parts;

Fig. 2 is a front elevational view, partially in cross section, of the assembled coupling;

Fig. 3 is an exploded view partially in vertical cross section and partially in elevation of the coupling parts; and Fig. 4 is an isometric view of a flexible element employed in the coupling assembly.

With reference to the several figures of the drawing, the coupling comprises hub portions 1 and 2 with flange portions 3 and 4 which are cut away in the manner shown in Figure 1 to permit the cut away flange portions to interact in driving alignment when the coupling elements are assembled on a pair of shafts 5 and 6. Coupling elements 1 and 2 are secured to the shafts in the usual manner as by keys 7 and 8.

As shown in Figure 3, the peripheries of the coupling elements are provided with teeth 9, such as are employed in silent belt drives, for receiving flexible belted material 10 having teeth interacting with the teeth 9 of the coupling flanges. Such a flexible belting material is shown in Figure 4 and consists of rubberized fabric structures with metal reinforcing 11, if needed. When the coupling parts 1 and 2 are assembled by moving them axially with the cut out portions of the flanges interacting, the belting material 10 is slipped over the teeth 9 in the same manner as a belt would be placed on a pulley, except that the flexible belting material is an annular member prefabricated in the form of an endless belt that fits snugly on the teeth 9 of the coupling flanges.

The tooth portions of the couplings may be grooved as shown at 12 to receive rings 13 which may be made of spring steel or other suitable material which, as shown in Fig. 2, constitute guides to retain the belting material 9 when assembled on the coupling flanges.

In operation the coupling, when assembled in the manner shown in Figures 1 and 2 of the drawing, provides a loose connection with ample space between the coacting coupling elements to prevent contact and they are maintained in their separated position by the toothed flexible belting material 10. In operation the coupling elements are separated and float, as it were, through their engagement with the flexible belting material that completely surrounds them.

It is evident from the foregoing description of this invention that a coupling made in accordance therewith allows considerable flexibility to assure smoothness of operation without imposing any undue bearing loads on the coupled shaft bearings. It is also evident that such couplings may be produced of any size and that the flexible belting material may have different toothed designs from that shown. The retaining rings may or may not be used, depending upon the operating conditions and whether or not they would cause creepage of the belting material on the coupling peripheries.

Although one embodiment of the invention has been herein illustrated and described, it will be evident to those skilled in the art that various modifications may be made in the details of construction without departing from the principles herein set forth.

I claim:

A flexible coupling comprising a plurality of coupling elements adapted for mounting on the ends of shafts in coaxial alignment, said coupling elements having axially extending cut out flanges interacting to maintain driving alignment, the flanges thereof having toothed peripheries, and a preformed annulus of resilient material having teeth interacting with the teeth of the coupling elements disposed around the periphery of the coupling flanges for gripping engagement therewith, the pitch diameter of said annulus being substantially that of the pitch diameter of the coupling elements, said coupling elements having means for retaining said annulus against lateral displacement, said means consisting of grooves spaced from the outer edges of the toothed periphery of the coupling elements, and complementary shaped rings in said grooves for retaining the resilient annulus therebetween.

References Cited in the file of this patent

UNITED STATES PATENTS

| | | |
|---|---|---|
| 1,921,144 | Ahnger | Aug. 8, 1933 |
| 2,079,460 | Marty | May 4, 1937 |
| 2,655,798 | Neher | Oct. 20, 1953 |